H. R. ARBUCKLE.
ANIMAL TRAP.
APPLICATION FILED JUNE 26, 1909.
965,618.
Patented July 26, 1910.
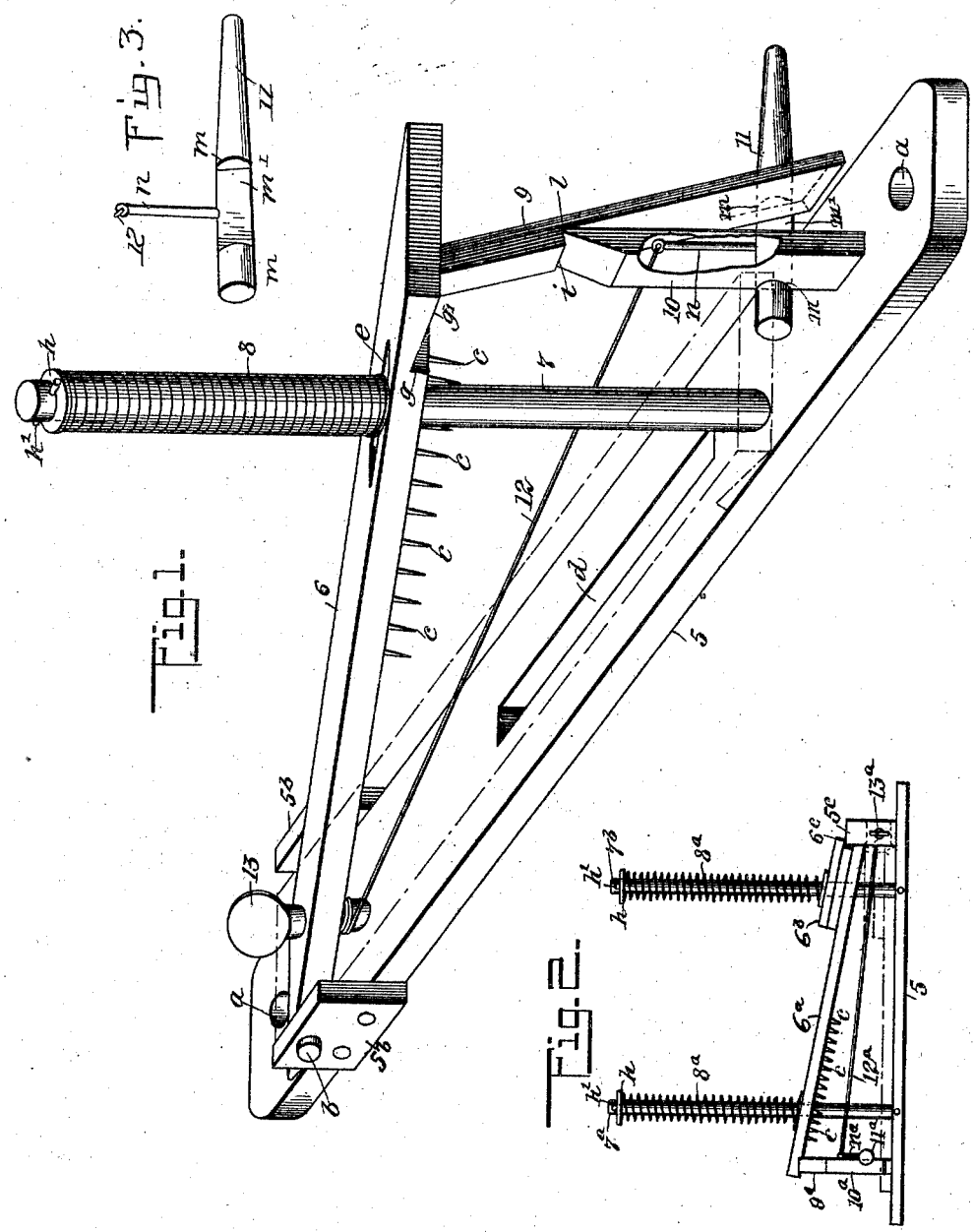

UNITED STATES PATENT OFFICE.

HARRISON R. ARBUCKLE, OF WANETTE, OKLAHOMA.

ANIMAL-TRAP.

965,618.  Specification of Letters Patent.  Patented July 26, 1910.

Application filed June 26, 1909. Serial No. 504,508.

*To all whom it may concern:*

Be it known that I, HARRISON R. ARBUCKLE, a citizen of the United States, and a resident of Wanette, in the county of Pottawatomie and State of Oklahoma, have invented a new and Improved Animal-Trap, of which the following is a full, clear, and exact description.

This invention relates to a class of traps in which the animal is caught and held by spring-actuated stabbing forks, and has for its object to provide novel details of construction for a trap of the indicated character, that are simple, practical and inexpensive, that render the trap very sensitive to the contact of a wild creature that attempts to pass between the working parts, and in all cases, when the trap is sprung, instantly sieze the animal, which causes the springing of the trap and hold it securely.

The invention consists in the novel construction and combination of parts, as is hereinafter described and defined in the appended claims.

Reference is to be had to the accompanying drawings forming a part of this specification, in which similar characters of reference indicate corresponding parts in both views.

Figure 1 is a perspective view of one example of construction for the trap, Fig. 2 is a reduced side view of a slightly changed construction for the same, and Fig. 3 is a perspective view of the trigger rod and tripping finger.

In several views representing the improvement, 5 indicates a base-plate whereon other details are supported in operative positions, said base-plate, that is formed of suitable material, consisting of an elongated flat block perforated at $a$, $a$, near each end thereof.

A presser-block 6, of rectangular form and suitable dimensions, that are nearly equal with the length and width of the base-plate 5, is rockably mounted on the base-plate, preferably by means of two upright hinge-blocks $5^b$, $5^b$, that are oppositely secured on the side edges of the base-plate near one end thereof, said blocks having opposite perforations therein, which receive trunnions $b$ that project from the side edges of the presser-block, one of said trunnions appearing in Fig. 1, whereby the presser-block is adapted for rocking movement toward and from the base-plate 5.

A series of spaced teeth $c$ project from the lower side of the presser-block 6, extending in a longitudinally-disposed row thereon at its transverse center, and in the base-plate 5 a slot $d$ is formed, wherein the teeth will enter when the presser-block is rocked downward and nearly contacts with said base-plate.

Forward of the slot $d$ a guide-post 7 is erected on the base-plate 5 and passes loosely through a longitudinal slot $e$ that is formed in the presser-block 6. A transverse shoulder $g$ is formed on the lower side of the presser-block 6, forward of the post 7, by the removal of material, preferably on an incline $g'$, as shown in Fig. 1.

A strong coiled spring 8 is mounted upon the guide-post 7 above the presser block 6, and exerts pressure on said block, the spring being held in place by a washer $h$ and pin $h'$ that are disposed in engagement with the upper end of the post, as shown in Fig. 1. The means for propping the presser block 6 in upwardly-rocked condition against the pressure of the spring 8 in a manner which will permit its sudden release when touched by a wild animal, consists essentially of the following details.

9 represents a hook bar that is preferably formed as shown in Fig. 1, consisting of a rectangular strip of suitable material, having an offset shoulder $i$ formed on one side thereof at a proper distance from its normally upper end. A prop bar 10 that is a complementary member of the trap-setting mechanism, is in the form of a rectangular billet of suitable material, that at the upper end is sloped on one side, so as to give the upper end wedge form, that terminates in a thin edge $l$. The lower end of the prop bar 10 is at a right angle with its sides, and thus adapts the prop bar to stand erect on the base plate 5. The length of the prop bar 10, is supplemented by the engagement of its thin upper end $l$ with the offset shoulder $i$ on the hook bar 9 when said parts are arranged for service, and the upper end of the hook bar is seated upon the incline $g'$; this connection and arrangement of parts requiring the presser block 6 to be raised a maximum degree against the pressure of the spring 8.

The hook bar 9, when in position for service, inclines outward toward its lower end, and to complete the trap-setting mechanism, a trigger rod 11 is provided. The trigger rod 11 consists of a preferably rounded billet that may be tapered somewhat near one end thereof, and at one side of its body is cut away, producing two spaced shoulders $m$, $m$, that are at the respective ends of the flat side $m'$ formed on the trigger rod by the removal of material as explained. A tripping finger $n$ is extended from the trigger rod 11 in a plane parallel with the flat side $m'$, and terminates at the upper end in an eyehole that receives one end of a flexible connection 12.

When the trap is to be set at a proper locality, the hook bar 9 and prop bar 10 are loosely engaged with each other, as shown in Fig. 1, and respectively seated at their remaining ends on the inclined surface $g'$ and the top surface of the base plate 5. The pressure of the spring 8 will cause the hook bar 9 to incline outward toward one side edge of the base plate, and to limit this outward inclination, the trigger rod 11 is employed by engaging its shoulders $m$, $m$, respectively with the corners on the prop bar 10 and the hook bar 9. The corners whereon the shoulders $m$, $m$, are mounted are those nearest to the guide post 7, and from its position on the trigger rod 11 the tripping finger $n$ is disposed vertically when the trigger rod is in position for service.

In a perforation in the hinged end portion of the presser block 6, a tension pin 13 is inserted, and as shown in Fig. 1, the flexible connection 12 is extended from the tripping finger $n$ lengthwise between the base plate 5 and the presser block 6, the extended end thereof being wrapped and secured upon the lower end of the tension pin 13.

The improved trap is particularly well-adapted for capturing wild animals, such as coons, minks or rabbits, and to adapt it for advantageous service, the trap is secured in position across the train or runway such animals traverse.

To anchor the trap in a selected position, pins are driven down through the perforations $a$, $a$, that are at each end of the base plate 5 into the soil.

The elevation of the presser block 6, effected when the trap is set, affords a passage across the trail, and the flexible connection that is rendered nearly taut by an adjustment of the tension pin 13, will be exposed to contact of the animal that attempts to crawl between the base plate and the presser block.

It will be seen that a slight pull on the flexible connection 12, will rock the pin $n$ and detach the trigger rod 11 from the bars 9 and 10, whereupon the full pressure of the spring 8 will be exerted for instant depression of the presser block 6. The forcibly-depressed presser block 6, carrying the teeth $c$ will embed said teeth in the spine of the animal, thus paralyzing it, so that while not injuring the pelt of the animal, the teeth by their grip will hold the game until taken from the trap.

In Fig. 2, the trap is shown slightly modified in construction, whereby the pressure of duplicate springs is afforded for the depression of the presser block. On inspection of Fig. 2, it will be noted that a flange $5^c$ is erected transversely at the rear end of the base plate 5, and upon said base plate near the flange $5^c$, a guide post $7^b$ is erected, a similar guide post $7^a$ being positioned near the forward end of said base plate. Preferably, both posts $7^a$, $7^b$, are secured at their lower ends in perforations of the base plate $5^a$, whereby said posts are disposed vertically on the base plate. A presser block $6^a$ is provided, having a lip $6^c$ projected rearwardly from the rear end portion $6^b$ thereon, which latter is vertically apertured for the free reception of the rear guide post $7^b$, and a like aperture in the forward portion of the presser block $6^a$ loosely receives the front post $7^a$. Upon the posts $7^a$, $7^b$, two strong springs $8^a$ are respectively mounted, and held in slightly compressed condition by the washers $h$ and cross pins $h'$. The construction of the trap-setting mechanism is similar to that shown in Fig. 1, and is adjusted in the same manner, the hook bar $9^a$ and prop bar $10^a$ that are similar to the hook bar 9 and prop bar 10, being loosely held together for support of the presser block $6^a$ against the force of the springs $8^a$ by the trigger rod $11^a$ which hooks thereon in a manner similar to the engagement of the trigger rod 11 with the bars 9, 10. A tripping finger $n^a$ is secured on the trigger rod $11^a$ and from it extends a flexible connection $12^a$ between the base plate and the presser block, and at its rear end is secured on a cross pin $13^a$, which by its adjustment, renders the flexible connection measurably taut, so that an animal passing between the base plate and the presser block will depress the flexible connection and detach the trigger rod, thus permitting the presser block to descend and catch the animal. In setting the modified form for the trap, the lip $6^c$ is engaged with the forward upper edge of the flange $5^c$ which will support the rear end of the presser block $6^a$ elevated somewhat from the base plate 5 and permit both springs to press upon the block $6^a$. When the trap shown in Fig. 2 is set, the front end of the presser block $6^a$, will be elevated somewhat above the rear end thereof, and upon release of the front end, its descent will cause the toe 6ᶜ to leave the flange 5ᶜ, thus permitting both springs 8ᵃ to exert their full force for depression of the block 6ᵃ.

Having thus described my invention, I claim as new and desire to secure by Letters Patent:

1. An animal trap embodying an elongated base plate, a post on the base plate near one end thereof, an elongated presser block movably mounted at one end on the base plate, said block having at its opposite end an opening through which the post passes, a coiled spring on the post above the presser block, teeth on the lower side of the presser block, a trap-setting means comprising a prop bar, a hook bar engaging the presser block and engaged by the prop bar, a trigger rod engaging the said bars, a tripping finger on said rod, a pin at the rear end of the base plate, and a flexible connection secured to the tripping finger and pin.

2. An animal trap-setting device, comprising a prop bar tapered to give it wedge form at the upper end, a hook bar having an offset shoulder at one side between the ends thereof, a trigger rod flattened on one side producing two offset shoulders thereon, a tripping finger on said tripping rod, and a flexible connection extending rearward from the tripping finger.

3. An animal trap, embodying an elongated base plate, two posts erected from the base plate near respective ends thereof, a presser block having a lip on its rear end and loosely mounted upon the posts, two springs on the posts and pressing upon the presser block, an upright flange at the rear end of the base plate, whereon the lip may rest, teeth on the lower side of the presser block, and a trap-setting device controlled by a flexible connection that extends between the base plate and presser block.

4. In an animal trap, a base, a spring pressed presser block mounted at one end on the base plate to move toward and from the base, and a trap setting means comprising a prop bar, a hook bar engaging the presser block and engaged by the prop bar, a trigger rod engaging the said bars to hold the trap set, and a flexible member secured to the trigger rod and extending between the base and presser block with its other end secured to a support at the other end of the trap.

In testimony whereof I have signed my name to this specification in the presence of two subscribing witnesses.

HARRISON R. ARBUCKLE.

Witnesses:
O. L. BECKNER,
JAMES M. THOMPSON.